United States Patent Office 3,600,373
Patented Aug. 17, 1971

3,600,373
CONVERSION PRODUCTS OF COMPLEX METAL COMPOUNDS OF AZO DYESTUFFS WITH A BASIC DYESTUFF
Christian Zickendraht, Binningen, and Alfred Fasciati, Bottmingen, Switzerland, assignors to Ciba Limited, Basel, Switzerland
No Drawing. Filed Jan. 16, 1968, Ser. No. 698,109
Claims priority, application Switzerland, Jan. 25, 1967, 1,071/67
Int. Cl. C09b *45/16, 45/20;* D06p *1/10*
U.S. Cl. 260—146R                                            7 Claims

ABSTRACT OF THE DISCLOSURE

The invention relates to conversion products of complex metal compounds of azo dyestuffs which contain a basic dyestuff and a complex metal compound of an azo dyestuff free from sulphonic acid groups and also free from carboxyl groups not in vicinal position to an azo bridge and which contains a sulphonic acid-N-alkoxyalkylamide group. Said conversion products are suitable for dyeing or coloring natural or synthetic resins, waxes, lacquers and plastic compositions and show good fastness to light.

---

The present invention is based on the observation that new, valuable conversion products of complex metal compounds of azo dyestuffs may be obtained when complex metal compounds of monoazo dyestuffs that are free from sulphonic acid groups and also from carboxyl groups not in o-position to an azo bridge and contain a sulphonic acid-N-alkoxyalkylamido group, are reacted with basic dyestuffs.

Some of the starting materials, that is to say, azo dyestuffs that are free from sulphonic acid groups and from carboxyl groups not in o-position to an azo bridge and contain metal bound in complex union, for example aluminium or one of the metals of atomic numbers 24 to 29 inclusive, for example nickel or copper, or especially cobalt or chromium, if desired two or more of these metals, and contain a sulphonic acid-N-alkoxyalkylamido group, are already known. They may be prepared in known manner by treating the metal-free dyestuffs with a metal donor, for example in an acidic, neutral or alkaline medium, under atmospheric or superatmospheric pressure, if desired or required in the presence of a suitable additive capable of increasing the solubility or promoting the complex formation. Particularly suitable are the metalliferous monoazo dyestuffs which are obtained when an ortho-carboxyortho'-hydroxymonoazo dyestuff or an ortho-hydroxy-ortho'-aminomonoazo dyestuff, or especially an ortho,ortho'-dihydroxymonoazo dyestuff, is treated with a metal donor, advantageously a chromium or cobalt donor, in a manner such that a complex metal compound results that contains for each monoazo dyestuff molecule less than 1 atom, preferably about ½ atom, of metal. Such complex metal compounds, some of which are already known, may be prepared, for example, by reacting two metallizable monoazo dyestuffs that are free from sulphonic acid groups and from carboxyl groups not in vicinal position to the azo bridge, at least one of these dyestuffs containing a sulphonic acid-N-alkoxyalkylamide group, at a molecular ratio of 1:1:1, with a metal donor. These two monoazo dyestuffs may be different or identical. One of them, or preferably both, must contain a sulphonic acid-N-alkoxyalkylamide group; they may be prepared by known methods, for example by coupling an ortho-carboxy or ortho-hydoxydiazo compound, for example of the benzene series, that contains a sulphonic acid-N-alkoxyalkylamide group, with a compound capable of coupling in vicinal position to an aromatically bound amino or hydroxyl group (that is to say an aromatically bound hydroxyl group of an enolizable or enolized keto group).

The introduction of the sulphonic acid-N-alkoxyalkylamide group into the dyestuff component, for example into the diazo or coupling component or into the dyestuff already obtained by coupling, is advantageously carried out by reacting the corresponding sulphochloride with an alkoxyalkylamine by a known method. Said sulfonic acid-N-alkoxyalkylamide group containing up to 22 carbon atoms in said alkoxy moiety and up to 6 carbon atoms for said alkyl moiety. Suitable alkoxyalkylamines are those in which the alkoxy residue contains 1 to 8 carbon atoms. Particularly suitable alkoxyalkylamines are those which contain at least 5 carbon atoms. They may be obtained by reacting an aminoalkyl alcohol with an alkyl alcohol, for example by reaction of ethanolamine, propanolamine, isopropanolamine, butanolamine or hexanolamine with an aliphatic or cycloaliphatic alcohol, for example with methanol, ethanol, propanol, isopropanol, a butanol, an amyl alcohol, a hexyl alcohol, cyclohexyl alcohol, an octyl alcohol, for example 2-ethylhexanol and also higher alcohols, for example, undecyl, lauryl, cetyl, stearyl or oleyl, myristyl or behenyl alcohol.

Instead of by etherification, the said alkoxyalkylamines, particularly the alkoxypropylamines (or alkoxy-2- (or -3)-methylpropylamines), may be obtained by a simple reaction of the above-mentioned alcohols with nitriles of unsaturated acids followed by catalytic hydrogenation, for example, by reaction with acrylonitrile, crotonic acid nitrile, allylcyanide or methacrylonitrile.

The treatment of the monoazo dyestuffs containing a sulphonic acid-N-alkoxyalkylamine group with the metal donor is preferably carried out in a weakly acidic to alkaline medium. Therefore, preferred metal donors are metal compounds that are stable in an alkaline medium, for example metal compounds, especially cobalt or chromium compounds, of aliphatic hydroxycarboxylic acids or dicarboxylic acids containing the metal in complex union. As examples of aliphatic hydroxycarboxylic acids and dicarboxylic acids there may be mentioned inter alia oxalic, lactic, glycollic, citric and especially tartaric acid; from among aromatic ortho-hydroxycarboxylic acids there may be mentioned, for example, those of the benzene series, for example 4-, 5- or 6-methyl-1-hydroxybenzene-2-carboxylic acid and above all unsubstituted 1-hydroxybenzene-2-carboxylic acid. The cobalt donor may also be a simple compound of divalent cobalt, for example cobalt sulphate or acetate.

As basic dyestuffs there may be used dyestuffs of the arylmethane, azo, thiazine, azine or oxazine series. It is advantageous to choose basic dyestuffs that are free from sulphonic acid groups. From among dyestuffs of the arylmethane series those of the xanthene series or of the di- or triarylmethane series containing at least two substituted amino groups may be especially mentioned and preferably those which contain the amino groups in para-position to the central carbon atom.

The reaction of the complex metal compounds of dyestuffs of the kind defined above with the basic dyestuffs in accordance with the present invention may be carried out at room temperature or with heating, if desired in the presence of an organic solvent. Advantageously, one or more of these basic dyestuffs or their salts may be added to an aqueous solution of the complex dyestuff-metal compounds, whereupon the conversion product obtained settles out in a form that is easy to filter and can be isolated. The reaction can be carried out with dyestuff solutions of various pH values, preferably with those of pH value from 4 to 6. In many cases the reaction mixture obtained on converting the metal-free dyestuffs into the corresponding complex metal compounds may be used directly for the reaction.

The conversion products of this invention may also be prepared by metallizing the sulphonamide dyestuffs referred to above in the presence of basic dyestuffs.

The products obtained by the present process are new; they are conversion products (salts) of basic dyestuffs with complex metal compounds of azo dyestuffs that are free from sulphonic acid groups and also from carboxyl groups not in o-position to an azo bridge and contain a sulphonic acid-N-alkoxyalkylamide group. The conversion products are well-defined crystalline substances.

They are soluble in organic solvents for example esters, acetone, benzine, benzene and especially in alcohol. They are suitable for dyeing or colouring natural or synthetic resins, waxes, lacquers and plastic compositions of, for example, cellulose ethers or esters, for example for spin dyeing acetate rayon and for dyeing or colouring natural or synthetic polymers for example polyamides and polyurethanes. They may also be used for printing various materials, for example paper. Dyeings produced with the conversion products of this invention are distinguished by good fastness to light. Compared with the known conversion products of basic dyestuffs and metal complexes of azo dyestuffs, which contain an unsubstituted sulphonamide group or a sulphonamide group which does not contain the alkoxy-alkyl group above defined, they are advantageous in that they produce more transparent dyeings.

Unless otherwise indicated, parts and percentages in the following examples are by weight.

EXAMPLE 1

44.4 parts of the dyestuff obtained from diazotized 2 - amino-1-hydroxybenzene-4-isopropoxypropyl-sulphonamide and 1-phenyl-3-methyl-5-pyrazolone are suspended in a solution of 500 parts of water at 80° C. and 27 parts of 30% sodium hydroxide solution together with 250 parts of a cobalt sulphate solution containing 1.18% of cobalt and the whole is stirred for 30 minutes at 80–85° C. to complete the formation of the complex compound. The suspension is then run into a solution of 48 parts of the dyestuff of the formula

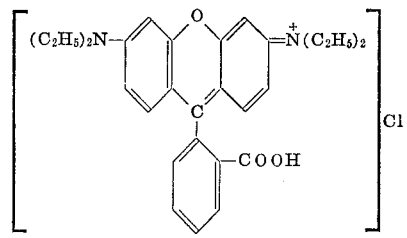

in 500 parts of water, and the pH value is maintained at 4 by adding acetic acid. The whole is stirred for 1 hour and the dyestuff-complex compound filtered and washed with water. In the dry state it is a red powder which forms a bluish red solution in alcohol. A solution in nitrocellulose lacquer forms a brilliant bluish red coating on a suitable support.

EXAMPLE 2

When in the above example 1-phenyl-3-methyl-5-pyrazolone is replaced by 2-hydroxynaphthalene all other conditions being identical, a dyestuff-complex compound is obtained which gives a red violet solution in alcohol and forms brilliant pink lacquer coatings.

Similar dyestuffs that produce lacquer coatings of the shades shown in Column IV of the following table are obtained by the method described in the above examples by reacting the monoazo dyestuffs of Column I with the corresponding metal donors of Column II and precipitating the resulting 1:2-metal complex with a solution of the dyestuff shown in Column III.

TABLE—Continued

| I | II | III | IV |
|---|---|---|---|
| (structure: 2-hydroxy-phenylazo with CO-CH₃ / CONH-phenyl and SO₂NH-(CH₂)₃-OCH(CH₃)₂) | Cobalt sulphate | [(H₅C₂)₂N—xanthene—N⁺(C₂H₅)₂] Cl⁻ with COOH on phenyl | Scarlet. |
| (structure: 2-hydroxy-phenylazo pyrazolone with CH₃, phenyl, HO-C, SO₂NH-(CH₂)₃-OCH(CH₃)₂) | …do… | Same as above | Bluish red. |
| (structure: 2-hydroxy-phenylazo pyrazolone with CH₃, phenyl, HO-C, SO₂NH-(CH₂)₃-O-CH(CH₃)-CH₂-CH(CH₃)₂) | | [(C₂H₅)₂N—xanthene—N⁺(C₂H₅)₂] Cl⁻ with COOH on phenyl | Do. |
| (structure: cyclohexanol-azo with CO-CH₃ / CONH-cyclohexyl and SO₂NH-(CH₂)₃-O-cyclohexyl) | Cobalt sulphate | [(C₂H₅)₂N—xanthene(reduced)—N⁺(C₂H₅)₂] Cl⁻ with COOH on cyclohexyl | Scarlet. |
| (structure: cyclohexanol-azo pyrazolone with CH₃, cyclohexyl, HO-C, SO₂N-CH₃-(CH₂)₃-O-CH(CH₃)₂) | …do… | [(C₂H₅)₂N—xanthene(reduced)—N⁺(C₂H₅)₂] Cl⁻ with COOH on cyclohexyl | Bluish red. |
| (structure: cyclohexanol-azo pyrazolone with CH₃, cyclohexyl, HO-C, SO₂N-(CH₂)₂-O-CH(CH₃)₂) | …do… | [(CH₃)₂N—cyclohexyl—C(NH₂⁺)—cyclohexyl—N(CH₃)₂] Cl⁻ | Yellow. |

TABLE—Continued

| I | II | III | IV |
|---|---|---|---|
| 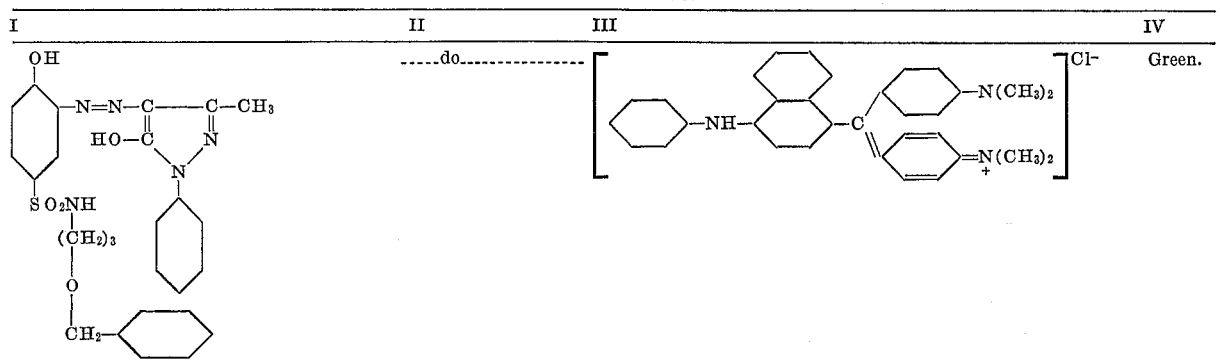 | ....do.............. | | Green. |

What is claimed is:

1. A reaction product of 1:2 complex metal compound of a hydroxybenzeneazopyrazolone-, a hydroxybenzeneazonaphthol- and a hydroxybenzeneazoacetanilideazo dyestuff wherein the complex metal is selected from aluminum and metals of atomic numbers of 24 to 29; with a basic xanthene, di- or triphenylmethane- or a diphenylnaphthylmethane-dyestuff, wherein the azo and basic dyestuffs are both free from sulfonic and carboxylic acid groups, and the azo-dyestuff contains sulfonic acid N-alkoxyalkylamide, N-benzyloxyalkylamide or N-cyclohexyloxyalkylamide containing up to 22 carbon atoms in said alkoxy moiety and up to 6 carbon atoms for said alkyl moiety.

2. A reaction product as claimed in claim 1, wherein the N-alkoxyalkyl substituent is alkoxypropyl in which the alkoxy residue contains 1 to 8 carbon atoms.

3. A reaction product of claim 1, of a 1:2-chromium- or cobalt complex wherein the azo-dyestuff contains sulfonic acid N-alkoxyalkylamide.

4. A reaction product of claim 3 wherein the sulfonic acid N-alkoxyalkylamide contains at least five carbon atoms.

5. The conversion product as claimed in claim 1, containing in an equimolecular ratio the 1:2-cobalt complex of the azodyestuff of the formula

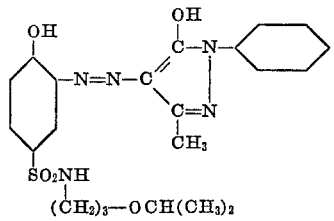

and the basic dyestuff of the formula

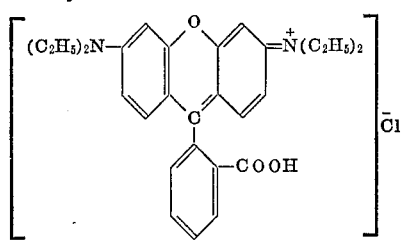

6. The conversion product as claimed in claim 1, containing in an equimolecular ratio the 1:2-cobalt complex of the azodyestuff of the formula

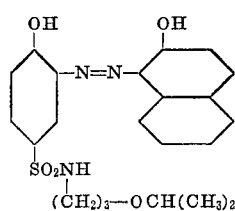

and the basic dyestuff of the formula

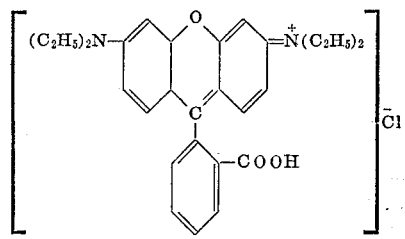

7. The conversion product as claimed in claim 1, containing in an equimolecular ratio the 1:2-cobalt complex of the azodyestuff of the formula

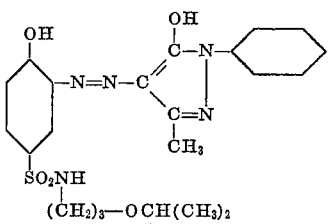

and the basic dyestuff of the formula

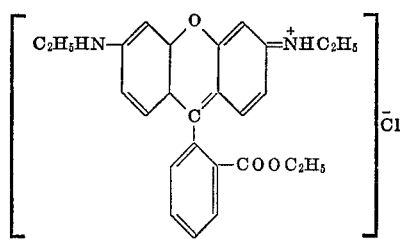

References Cited
UNITED STATES PATENTS

| 2,779,757 | 1/1957 | Ruckstuhl et al. | 260—151 |
| 2,814,614 | 11/1957 | Zickendraht | 260—147X |
| 2,817,655 | 12/1957 | Schetty et al. | 260—147 |
| 2,826,573 | 3/1958 | Strobel et al. | 260—147 |
| 2,841,576 | 7/1958 | Zickendraht et al. | 260—147X |
| 3,406,162 | 10/1968 | Neier | 260—147X |

FLOYD O. HIGEL, Primary Examiner

U.S. Cl. X.R.

8—3, 4, 6, 7, 42R, 42B, 50, 71; 117—138.8R, 138.8D, 144, 154; 260—37R, 37N, 147, 149, 151, 163, 193, 197, 336, 388, 391, 566F

CASE 6104/E

PO-1050
(5/69)

UNITED STATES PATENT OFFICE
CERTIFICATE OF CORRECTION

Patent No. 3,600,373    Dated August 17, 1971

Inventor(s) CHRISTIAN ZICKENDRAHT ET AL

It is certified that error appears in the above-identified patent and that said Letters Patent are hereby corrected as shown below:

Column 7, line 24, in accordance with the Supplementary Amendment After Final filed October 28, 1970, after "dyestuff" insert --- wherein the basic dyestuffs contain at least two substituted amino groups in para-position to the central carbon atom; ---.

Signed and sealed this 18th day of July 1972.

(SEAL)
Attest:

EDWARD M. FLETCHER, JR.
Attesting Officer

ROBERT GOTTSCHALK
Commissioner of Patents